ROSCOE C. CLARK JR.
GEORGE C. HOWARD
INVENTOR.

ROSCOE C. CLARK JR.
GEORGE C. HOWARD
INVENTOR.

United States Patent Office 2,782,857
Patented Feb. 26, 1957

2,782,857

PLUGGING OFF WATER SANDS

Roscoe C. Clark, Jr., Ponca City, and George C. Howard, Tulsa, Okla., assignors to Stanolind Oil and Gas Company, Tulsa, Okla., a corporation of Delaware Application December 10, 1953, Serial No. 397,348

13 Claims. (Cl. 166—22)

This invention pertains in general to a method of treating wells to shut off water. More particularly, this invention is directed to a process for cementing a well with a slurry which selectively sets in water-producing zones penetrated by an oil well so as to impermeabilize the pores, fissures, and the like in these water-producing zones, but which does not set in oil-producing zones so that the water-producing zones are selectively plugged without materially decreasing the oil productivity of a well. This is a continuation-in-part of our copending application Serial Number 313,304 filed October 6, 1952, now abandoned.

Various methods have been proposed in the art for plugging water-producing zones. These include, for example, the injection of a hydrophilic solid such as clay or starch into a formation. These solids are supposed to swell within the formation in the presence of water so as to impermeabilize the water-producing zone. The injection of a material into a water-producing formation to form in situ a water-insoluble precipitate upon reaction of the material with the formation waters has also been proposed. These and other proposals obviously have a number of limitations, such as the absence of selectivity for water-producing zones, which have prevented their commercial acceptance.

It is an object of this invention to provide an improved process for impermeabilizing formations, particularly fractured formations which produce water. It is a more specific object of this invention to provide a process for selectively treating a formation which produces from both water and oil-producing zones to plug the pores, fractures, etc., in the water-producing zone without decreasing production from the oil-producing zone. These and other objects of this invention will become apparent from the following description in which reference will be made to the accompanying drawings.

Figure 1:
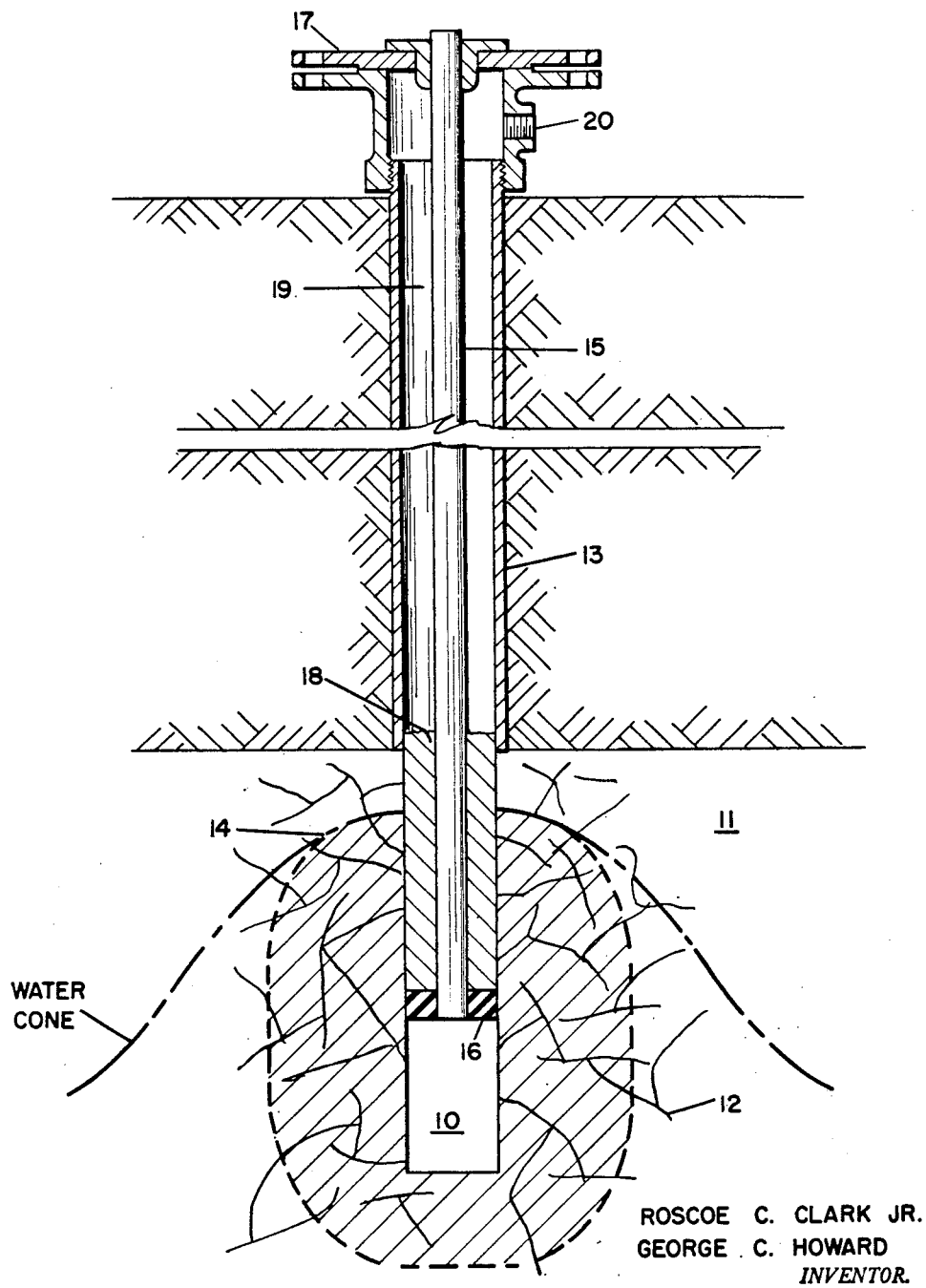
Figure 2:
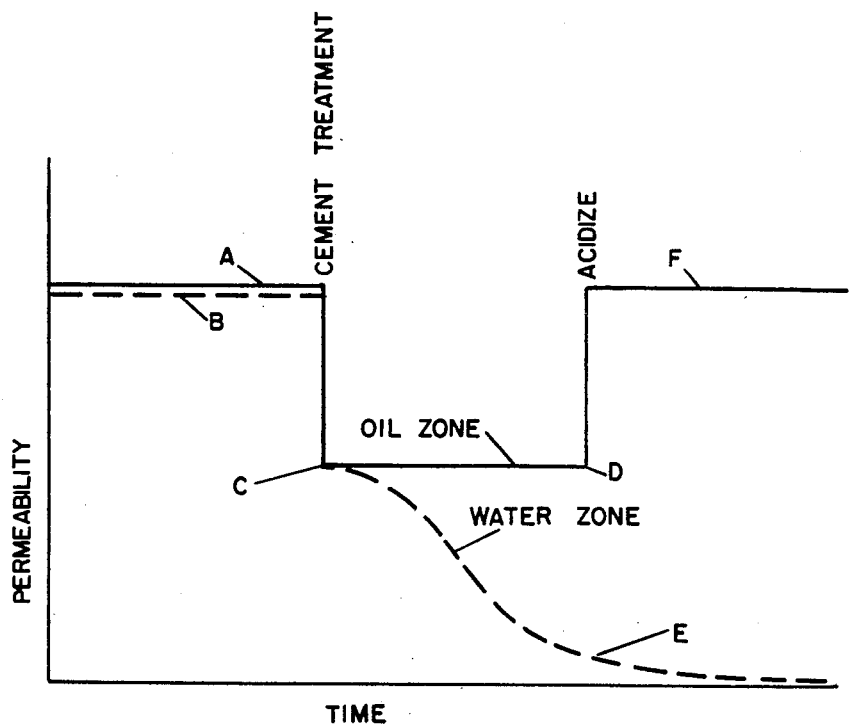

In these drawings, Figure 1 is a schematic representation of a cross-section of the earth showing how the water zone in an oil well is plugged selectively; and Figure 2 is a plot showing permeability versus time for the oil and water zones before, during and after treatment in accordance with this invention.

In brief, our treatment of a well for selectively shutting off water production consists of first isolating a zone in a well within the water-producing area, injecting into a fracture in this isolated zone a hydrophobic liquid slurry of hydraulic cement, and producing the well to contact the hydraulic cement in the water zone with water and cause the cement to hydrate in and plug the fracture in the water-producing zone. Any cement carried by the hydrophobic liquid into the oil-producing formation may then be removed by an acid treatment if the oil production has been adversely affected.

Referring now specifically to Figure 1 for a more detailed description of this invention, a well 10 is drilled into a formation 11 which has a multiplicity of random fractures 12. The well is incased with a casing 13 down to the producing formation 11. When the well commences to produce water, a survey is made throughout the openhole section of the formation 11 to determine the zone or zones of water production. Any of a number of commercially available processes for locating water entry zones in a well may be used; but the process disclosed in U. S. Patent 2,595,610 Silverman-Hartline is preferred. When the top elevation of water production 14, i. e., the oil-water contact, has been located in the well, a tubing 15 having a formation packer 16 located at the lower end thereof is introduced into the well. The formation packer is seated in the well within the water-producing zone, typically between about two and about twenty feet below the top of the water-producing zone. Since the random fractures 12 have been found to occur both horizontally and vertically, particularly in limestone and dolomite formations and in some sandstone formations such as the producing formations in the Spraberry Trend of West Texas, it appears that the slurry of cement, when it is injected into a well, migrates both vertically and horizontally in the fractures, tending to produce an approximately spherical plug. Thus, if it is desired to impermeabilize the fissures, fractures, vugs, and the like for a distance of as much as ten feet horizontally from the well, it is presumed that the sealing agent will migrate vertically about ten feet, and therefore the packer 16 is desirably set at about ten feet lower in the well than the indicated water-oil contact. In the case of formations which are not naturally fractured and where it is desired to produce an impermeable sheath near the oil-water contact, the formation packer 16 may be located on or adjacent to the oil-water contact, particularly in formations such as sandstone producing formations which commonly fracture along horizontal bedding planes. In either case, it is generally expected that some of the sealing agent will be displaced vertically within the formation and enter the oil-producing zone. Contamination of the oil-producing zone in this system is not considered disastrous since the plugging agent entering that zone can be removed as hereinafter described. The packer is thus desirably set in the water zone so that a major part of the cement will be placed in that zone.

After the formation packer has been seated and the tubing head 17 has been installed, it is generally desirable, especially in highly fractured formations, to plug temporarily the fractures above the packer and prevent by-passing the packer. A packer sealing agent 18 is therefore injected into the annular space 19 of the well through the side outlet 20 of tubing head 17. This packer sealing agent may comprise, for example, a viscous gel such as a soap-hydrocarbon gel, or a viscous gel containing a temporary bridging material such as ground naphthalene as described in United States Patent 2,728,395. The volume of this packer sealing agent is desirably greater than the annular volume of the uncased section of the well outside the tubing above the formation packer. This viscous gel and bridging material tend to plug the formation fractures, vugs, and large pores above the formation packer 16 at the well face so that fluid migration around the packer is prevented or retarded. This is particularly true when pressure is maintained on the packer sealing material, as for example by injecting a follower liquid such as oil into the annular space 10 on top of the packer sealing material and maintaining pressure on the follower liquid. Desirably, the packer sealing material is maintained under a pressure substantially as high as the pressure within the tubing and on the bottom side of the formation packer. In some cases, however, the casing 13 will not safely withstand such pressures and, in that case, we have found that substantially the same results can be obtained if a reduced pressure—a pressure lower than the cementing pressure—is maintained on the packer sealing material. It appears that the viscous liquid carries the bridging material into fractures above packer 16, producing a bridge which resists movement in either direction. Consequently, the pressure on the packer sealing material may be from one thousand to five thousand pounds, or more, less than the pressure on the cementing material and still prevent a substantial amount of the cementing material from bypassing the packer either within the well or through vertical fractures within formation 11 which connect the well above and below the position where the packer is set.

After the packer has been set and the packer sealing agent has been placed, the hydrophobic slurry of hydraulic cementing material is injected into the well below the packer 16 through tubing 15. This slurry is made up of any oil-well cement, including regular Portland cement, slow-set Portland cement, sulfate-resisting Portland cement, mortar, plaster of Paris, and the like. The liquid component is a liquid which is immiscible with water, typically a hydrophobic liquid which does not by itself hydrate the cement and does not mix with or absorb water that might hydrate the cement. Most hydrocarbons, including crude oil or refined hydrocarbons such as gasoline, kerosene, or heavier distillates such as fuel oil or the like, may be used. Other organic liquids such as fish oil, animal oil, carbon tetrachloride, the high molecular weight alcohols, ketones, and the like, while more expensive and less desirable in most cases, may be used to advantage in some cases. The hydrophobic liquid and hydraulic cement are made into a pumpable slurry by incorporating between about six and about fifteen gallons of liquid component per one-hundred-pound sack of cement. A ratio of about ten gallons of hydrophobic liquid per sack of hydraulic cement is preferred. In field operations where the liquid-cement ratio is more easily determined by the specific gravity of the slurry, a weight of between about eleven and about fifteen pounds per gallon, typically about 12.5 pounds per gallon, of the slurry is preferred in the case of a light hydrophobic liquid such as kerosene. Since the viscosity of the hydrophobic liquid used affects the pumpability of the slurry, it will be apparent that the specific gravity of a pumpable slurry is influenced to some extent by the hydrophobic liquid used—the more viscous liquids requiring a lower cement-liquid ratio.

This slurry is displaced, as by pumping, through tubing 15 into the well below the packer and then into the large pores, the vugs, or the fractures in formation 11 in any desired amount, depending upon the volume of the zone which is to be impermeabilized. A ten to one-hundred-barrel treatment, typically about forty barrels, is preferred. The radial extent of the impermeable sheath or plug should extend into the producing formation preferably to a distance beyond the localized unstable pressure condition adjacent the well. That is, a formation is impermeabilized around the well and back into the formation to where the oil-water interface is stabilized and substantially unaffected by the pressure and flow conditions immediately surrounding the well.

In order that the cement particles completely seal the openings in the formation below the water-oil contact, it is sometimes desirable to obtain a squeeze pressure on the cement before all of the slurry is forced into the formation. That is, it is desirable to produce, in the formation adjacent the well, a bridge of solid or compact cement particles having substantially all of the liquid component filtered out and displaced further into the formation. As is well-known in this art, a squeeze pressure may sometimes be obtained during displacement of the slurry in the formation. Where a squeeze is more difficult, it is sometimes desirable before all of the slurry has been displaced into the formation to pump the slurry slowly or to stop pumping temporarily so that the liquid component has an opportunity to filter out of the slurry into the pores of the formation, thus building up a bridge or filter cake of cement particles in the more porous zones and particularly in the fissures, vugs, etc., of the formation adjacent the well. After all of the outlets from the well below the packer have been filled with compacted cement particles, the slurry cannot readily be injected into the formation and a higher displacement pressure is required, indicating that a cement squeeze has been obtained. As indicated, a squeeze is desirable, although not always necessary inasmuch as the cement particles in the fractures and other openings are sometimes substantially concentrated and compacted enough by filtration to produce a solid concrete plug after the cement is hydrated. In case a squeeze pressure is built up before all of the slurry has been displaced from the tubing, it may be desirable in some cases to circulate the remainder of the slurry out of the tubing by use of a circulating joint above the packer, as is well known in the art. However, since the hydraulic cement will not hydrate in the presence of the hydrophobic liquid, the danger of producing a cement bridge in the tubing is, of course, less than where the cement is in a water slurry.

When the cement in the tubing is circulated out, the packer sealing material is also circulated out of the well. Typically, crude oil or some other light hydrocarbon such as kerosene or gasoline may be used to displace these materials out of the well. After the packer sealing material has been displaced from the well, the circulation joint may be closed, or the tubing may otherwise be closed, so that continued injection of a light hydrocarbon into the well through annulus 19 dissolves the temporary bridging material deposited on the well walls and in the fractures and crevices above the packer. This hydrocarbon then penetrates the formation openings above the packer, displacing unset cement back into the formation and away from the well. Any amount of hydrocarbon may thus be injected into the well above the packer. It is believed that this oil does not, due to differences in specific gravity, wettability characteristics, the tendency of the cement particles to settle out of the slurry, and the like, displace a substantial amount of the slurry from the water zone. While the oil is preferably injected into the well above the packer before the packer is unseated and removed, it can be injected into the well at any time following the cement treatment and prior to water contamination which might hydrate the cement in the oil-producing zone. It is believed that most of the oil selectively enters the oil-producing formations, displacing and diluting any slurry which might be present.

Injection of the oil into the formation following the cement slurry is unnecessary generally and can apparently sometimes be avoided without any particular detriment to the well. After the cement slurry is placed, and preferably following the oil-flushing step, the packer 16 may be unseated and removed from the well. The tubing 15 is then rerun into the producing zone and the well is produced. Production of the well causes water from the water-producing zone to displace the hydrophobic liquid from the formation adjacent the well and thus bring the formation waters into contact with the cement in the water zone. This water displaces the oil on the cement particles, causing the cement to hydrate and produce a plug in the fractures within the water-producing zone, and thus impermeabilizing the fractures in that zone. When the well is produced, the cement particles in the fractures within the oil-producing zone are contacted only by oil and therefore do not hydrate and plug these oil-producing fractures. Any cement particles deposited in these fractures, or other openings within the oil-producing zone, do decrease to some extent the permeability of that zone, and therefore it is sometimes desirable to remove this cement from the oil-producing zone.

Where oil production has been decreased due to the presence of some of the cement entering the oil-producing zone, it can be removed to restore the oil production. That is, some of the cement particles may contact interstitial waters within the oil-producing zone and become hydrated, decreasing the permeability of the oil-producing zone. Also, the presence of the cement particles in a low-permeability zone, even if unset, would obviously tend to reduce the permeability of the oil-producing zone. We have found that in either case the permeability to oil, and accordingly the oil production of the well, can be restored when it has been decreased by the cement treatment by merely injecting acid into the formation. Thus, after a well has been treated by injecting a hydrophobic liquid slurry of hydraulic cement into the well, it may be produced for from a few hours to several weeks to hydrolize or set the cement in the water-producing zone and impermeabilize that zone, and to determine the producing characteristics of the well. If it is determined from this production test that oil production is decreased by the plugging treatment, acid is injected into the well. Any acid, typically a strong mineral acid such as hydrochloric acid, is injected into the well to remove the cement in the oil zone. As much as one thousand gallons, or more, of fifteen percent hydrochloric acid solution is preferred. Inasmuch as the water zone has been impermeabilized by the set cement, acid cannot enter that zone and therefore it all tends to enter the oil-producing zone, where, upon coming into contact with the cement particles, it reacts therewith, destroying these particles and restoring the permeability of the oil-producing zone.

This effect is shown in Figure 2, which is a plot of the permeability of both oil and water-producing zones before, during, and after a treatment as above-described. The permeability of the treated formation to oil is indicated in non-dimensional units at A and the permeability to water is indicated at B. After the formation is treated with cement as above-described, the permeability of the formation to both oil and water is reduced substantially, as indicated by the point C. After the cement treatment when the well is placed on production, the permeability to oil as indicated by the curve C—D remains substantially unchanged, while the permeability to water, as indicated by the curve C—E, is substantially reduced. After the permeability to water has been reduced due to hydration of the cement particles so that the permeability to water is substantially zero, acid is injected into the well. Since the permeability in the water zone is substantially zero, practically no acid enters that zone and it is directed into the oil-producing zone where it reacts with and removes the unset or partially-set cement particles, restoring the permeability in the oil zone to substantially its initial value, as indicated at F.

We have found that when a well which produces water is treated as above described, water from the well is sometimes forced back into the oil-producing channels and into the zones that produce oil and which otherwise probably contain very little water. We have also found that when a hydrocarbon-cement slurry is squeezed into a flow channel which contains an appreciable amount of water, the cement will hydrate or set. The slurry itself tends to displace the water ahead of it, but in some cases it is desirable to take additional measures to prevent contact between the cement and water in the oil zone, i. e., to displace the water from any highly permeable zones and flow channels which the slurry might enter. This is accomplished by a number of means including placing a surface active agent in the first part or leading edge of the slurry or in an oil solution preceding the slurry to reduce the interfacial tension between water and oil in the formation and allow the water to be displaced with the hydrocarbon. In the preferred process, a quantity of hydrophobic liquid, typically between about 10 and about 20 barrels or more, or a light oil such as lease crude, kerosene, diesel oil, or the like, without the added surface active agent, is used to displace the water. This liquid is injected into the well and displaced by the slurry down the well into the formation fractures and flow channels so that the formation contacted by the cement slurry is always dehydrated before the slurry arrives. This water is displaced out into the oil zone, and due to the resistance to flow offered by the slurry, the water bypasses the slurry as the well is produced. When a surface active agent is employed in the flushing liquid, it is typically one which at a very low concentration in the hydrophobic liquid reduces the surface tension between that liquid and the formation water to substantially zero. Surface active agents of this type are produced by a number of the chemical manufacturers. Suitable materials include a nonionic polyoxethylene sorbitol-cottonseed oil derivative surface active agent, and a substituted propylene diamene in which one hydrogen has been replaced by an alkyl group containing 16 to 18 carbon atoms per molecule. The latter is a cationic surface active agent manufactured by Armour Chemical Company and available commercially as Duomeen C, Duomeen S, and Duomeen T.

The amount of surface active agent added to the oil or the the leading edge of the hydrophobic liquid in the slurry is, due to the large number of variables, best determined by experiment. Samples of the well brine and hydrophobic liquid are mixed and sufficient oil-soluble surface active agent is added to the hydrophobic liquid to reduce the interfacial tension between the two to about zero. The quantity of surface active agent in the treating or flushing solution is then proportioned accordingly. It is generally desirable that a minimum concentration, as indicated by the pilot test, be used since an excess of surface active agent may produce a stable emulsion. Typically between about 0.1 and 1 percent of surface active agent by volume of hydrocarbon is required.

As an example of the field application and effectiveness of this invention, a well in the Midland Farms Field of West Texas which produced from a fractured limestone formation was treated in accordance with this invention. Immediately prior to the treatment, the well produced 17 barrels of oil and 113 barrels of water on a 24-hour production test. The well was then acidized with 4,000 gallons of fifteen percent hydrochloric acid. The well next was plugged back, plugging off about one-half of the producing interval, using cement and plastic, and then it produced 23 barrels of oil and 95 barrels of water per day, swabbing. The cement and plastic plug was drilled out to total depth and a formation packer was set at a point five feet below the top of the previous plug. Ten barrels of packer sealing agent, including a viscous hydrocarbon-soap gel having a viscosity of greater than about 5,000 centipoises including 200 pounds per barrel of ground naphthalene having a particle size throughout the range 4–100 mesh U. S. sieve was displaced to the open hole section above the packer in the annulus. The formation below the packer was then in sequence acidized with 1,000 gallons of regular fifteen percent hydrochloric acid and squeezed with 250 sacks of slow-set hydraulic cement slurried in 2,500 gallons of kerosene. A surface pressure of 1400 p. s. i. was held on the annular space and packer sealing agent by slowly injecting crude oil into the well with a hydraulic pump. The cement-kerosene slurry was injected into the well below the packer at a maximum pressure of 2400 p. s. i., which was accomplished near the end of the cement slurry displacement by stopping the slurry pump intermittently after about ninety percent of the slurry had been injected into the formation. On a production test following the cement-kerosene treatment, the well swabbed dry, indicating that substantially the total producing formation had been impermeabilized. The well was then acidized throughout the complete producing zone, a "down-the-hole" acidizing job, in two stages with 8,000 gallons of regular fifteen percent hydrochloric acid. Five barrels of an oil-soluble bridging agent, ground naphthalene, were included in the acid to cause the acid to plug temporarily any openings produced and enter other openings. Subsequent to the final acid treatment and about a month after the well had been placed back on production and had established equilibrium, it produced 102 barrels of oil and 60 barrels of water on a 24-hour production test.

A number of other wells in various areas have been treated in accordance with the above-described procedure. Typical examples and results are set out in the following Table I:

Table 1

| Description of producing formation | Production prior to treatment, bbls. | | Amount of cement hydrocarbon slurry used | Amount of acid used following cement, gallons | Production after treatment, bbls. | |
|---|---|---|---|---|---|---|
| | Oil | Water | | | Oil | Water |
| Fractured dolomite, Grayburg Zone, Midland Farms Field, Texas. | 87.5 (pumping) | 170 | 250 sacks slow-set<br>2,500 gals. kerosene | 19,000 | 16 (pumping) | 12 |
| Do | none (swabbing) | 250 | 250 sacks slow-set<br>3,000 gals. kerosene | none | 99 (pumping) | 63 |
| Do | do | 280 | 350 sacks slow-set<br>3,500 gals. kerosene | 20,000 | 284.5 (pumping) | none |
| Do | do | 360 | 230 sacks slow-set<br>2,500 gals. kerosene | none | 18 (swabbing) | 200 |
| Fractured limestone, Clearfork Zone, Goldsmith Field, Texas. | do | 360 | 115 sacks slow-set<br>1,150 gals. kerosene | 12,000 | 83 (flowing) | none |
| Fractured limestone, Madison Zone, Torchlight Field, Wyoming. | 23 (pumping) | 326 | 348 sacks slow-set<br>3,480 gals. kerosene | 500 | 16 (pumping) | 8 |

From the foregoing, it can be seen that the water production from a well can be materially reduced by the process of squeezing a fractured zone with a hydrophobic liquid slurry of hydraulic cement. It can also be seen that in many instances this treatment produces an increase in oil production.

While the above description has been directed to a method of impermeabilizing producing formations which are naturally fractured or otherwise are initially highly permeable, it can be seen that the process is highly adaptable to isolating the oil-producing zone in a well which also produces water by first creating the fracture artificially, necessarily along a horizontal plane, by use of the hydraulic fracturing process now well known in the art. That is, while our process is adaptable to treating formations which are naturally fractured, it is equally adaptable to treating formations which are artificially fractured, and particularly those which are artificially fractured at a selected elevation whereby an impermeable sheath of plugging material may be injected into a formation. Thus, it can be seen that our process is capable of substantial modification, and such modifications as may be construed to fall within the scope and meaning of the appended claims are also considered to be within the spirit and intent of the invention.

We claim:

1. A method of plugging off water production from a formation which produces both water and oil comprising injecting into said well a hydrophobic liquid slurry of hydraulic cement, displacing said slurry into said formation and producing said well to cause cement in the water zone of said formation to set when contacted by water.

2. A method of plugging off water production from a formation which produces both oil and water comprising injecting a quantity of a hydrophobic liquid into said well and said formation to displace well fluids back into said formation a substantial distance and then injecting into said well following said hydrophobic liquid a quantity of a hydrophobic liquid slurry of hydraulic cement, displacing at least part of said slurry into said formation, and producing said well to cause cement in the water zone of said formation to set when contacted by water.

3. A method of plugging off water production from a formation which produces water and oil comprising injecting into said well a hydrophobic liquid slurry of hydraulic cement, forcing said slurry into a fracture within said formation, hydrating the cement in the water zone of said formation by contacting said cement with water, and then acidizing said well to remove unset cement from said oil zone.

4. A method of plugging off water production from a formation which produces from both water and oil zones comprising injecting into said well a liquid which will displace well fluid from said well and from the flow channels around said well and which will not hydrate hydraulic cement, displacing said liquid into said formation with a hydrophobic liquid slurry of hydraulic cement, displacing at least part of said slurry into said formation to deposit hydraulic cement in the flow channels thereof, hydrating said hydraulic cement in said water zone by producing said well to cause said hydraulic cement to be contacted by water, and then injecting acid into said oil zone to remove unset cement.

5. A method of treating a formation which produces from a water zone and an oil zone to shut off water production in a well comprising setting a packer in said well at an elevation within said water zone and below the oil-water contact, injecting into said well below said packer a hydrophobic liquid slurry of hydraulic cement, forcing said slurry into a fracture in said formation, and then producing said well to cause cement in said water zone to be contacted by water and set.

6. A method of treating a formation which produces from a water zone and an oil zone to shut off water production in a well comprising setting a packer in said well at an elevation within said water zone and below the oil-water contact, injecting under pressure a packer sealing agent into the annular space around said tubing above said packer, injecting a hydrophobic liquid into said well below said packer, displacing said liquid into said formation with a hydrophobic liquid slurry of hydraulic cement, forcing said slurry into a fracture in said formation, unseating said packer, and then producing said well to cause cement in said water zone to be contacted by water and set.

7. A method of treating a formation which produces from a water zone and an oil zone to shut off water production in a well comprising setting a packer in said well at an elevation within said water zone and below the oil-water contact, injecting under pressure a packer sealing agent into the annular space around said tubing above said packer, injecting into said well below said packer a hydrophobic liquid slurry of hydraulic cement, forcing said slurry into a fracture in said formation, unseating said packer, producing said well to cause cement in said water zone to be contacted by water and set and then acidizing said well to remove unset cement from said oil zone.

8. A method according to claim 7 including the step of flushing the well fluids from said well and adjacent flow channels before said slurry is forced into said formation.

9. A method of treating a formation which produces from a water zone and an oil zone to shut off water production in a well comprising setting a packer in said well at an elevation within said water zone and below the oil-water contact, injecting under pressure a packer sealing agent into the annular space around said tubing above said packer injecting into said well below said packer a hydrophobic liquid slurry of hydraulic cement, forcing said slurry into a fracture in said formation, circulating said packer sealing material out of said well, injecting a hydrocarbon through said annular space into said oil zone to displace slurry from adjacent said well in said oil zone back into said formation, and then producing said well to cause cement in said water zone to be contacted by water and set.

10. A method of treating a formation which produces from a water zone and an oil zone to shut off water production in a well comprising setting a packer in said well at an elevation within said water zone and below the oil-water contact, injecting under pressure a packer sealing agent into the annular space around said tubing above said packer, injecting into said well below said packer a hydrophobic liquid slurry of hydraulic cement, forcing said slurry into the flow channels in said formation, circulating said packer sealing material out of said well, injecting a hydrocarbon through said annular space into said oil zone to displace slurry from adjacent said well in said oil zone back into said formation, producing said well to cause cement in said water zone to be contacted by water and set and then acidizing said well to remove unset cement from said oil zone.

11. A method according to claim 10 in which said packer sealing material comprises a slurry of temporary bridging material in a viscous liquid and in which the quantity of said packer sealing material is sufficient to fill said annular space around said tubing above packer throughout the oil zone of said well.

12. A method according to claim 10 in which said hydrophobic liquid slurry comprises between about 6 and 15 gallons of said hydrophobic liquid per one-hundred-pound sack of said hydraulic cement.

13. A method of treating a formation which produces from a water zone and an oil zone to shut off water production in a well comprising surveying said well to determine the elevation of the oil-water contact in said formation adjacent said well, injecting a hydrophobic liquid into said formation to displace well fluids from said well and the flow channels adjacent thereto, setting a formation packer on a tubing in said well at about said elevation, placing a slurry of temporary bridging material and a gel in the annular space surrounding said tubing above said packer and applying pressure thereto to seal temporarily the fractures in said formation above said packer which are penetrated by said well, injecting into said well through said tubing a hydrophobic liquid slurry of hydraulic cement, forcing at least part of said slurry into said flow channels in said formation below said packer, circulating said packer sealing material out of said well, injecting a liquid into the oil zone above said packer to displace slurry from adjacent said well in said oil zone back into said formation, producing said well to cause cement in said water zone to be contacted by water and set, and then acidizing said well to remove unset cement from said oil zone.

References Cited in the file of this patent

UNITED STATES PATENTS

| | | |
|---|---|---|
| 1,107,979 | Mitchell | Aug. 18, 1914 |
| 2,065,212 | Cannon | Dec. 29, 1936 |
| 2,146,480 | Kennedy | Feb. 7, 1939 |
| 2,223,804 | Kennedy | Dec. 3, 1940 |
| 2,258,616 | Kendrick | Oct. 14, 1941 |
| 2,268,010 | Baum | Dec. 30, 1941 |

OTHER REFERENCES

Acidizing Handbook, B. M. Kingston, (©) 1947, Gulf Pub. Co., pages 70, 71, 73, and 74.